US009836917B2

(12) United States Patent
Bennett

(10) Patent No.: US 9,836,917 B2

(45) Date of Patent: Dec. 5, 2017

(54) METHOD AND SYSTEM FOR PROVIDING A FEATURE GAME

(71) Applicant: Aristocrat Technologies Australia Pty Limited, North Ryde (AU)

(72) Inventor: Nicholas Bennett, Manly Vale (AU)

(73) Assignee: Aristocrat Technologies Australia Pty Limited, North Ryde (AU)

( * ) Notice: Subject to any disclaimer, the term of this patent is extended or adjusted under 35 U.S.C. 154(b) by 189 days.

(21) Appl. No.: 14/821,952

(22) Filed: Aug. 10, 2015

(65) Prior Publication Data

US 2016/0042594 A1 Feb. 11, 2016

(30) Foreign Application Priority Data

Aug. 10, 2014 (AU) ................................ 2014903102

(51) Int. Cl.
*G06F 17/00* (2006.01)
*G07F 17/32* (2006.01)

(52) U.S. Cl.
CPC ...... *G07F 17/3225* (2013.01); *G07F 17/3244* (2013.01); *G07F 17/3265* (2013.01)

(58) Field of Classification Search
USPC ..................................................... 463/16–25
See application file for complete search history.

(56) References Cited

U.S. PATENT DOCUMENTS

2012/0004020 A1* 1/2012 Young ..................... G07F 17/34 463/20
2016/0042594 A1* 2/2016 Bennett ............... G07F 17/3244 463/20
2016/0042597 A1* 2/2016 Olive .................. G07F 17/3258 463/21
2016/0049037 A1* 2/2016 Kroon ................. G07F 17/3258 463/20

* cited by examiner

*Primary Examiner* — Ronald Laneau
(74) *Attorney, Agent, or Firm* — McAndrews, Held & Malloy, Ltd.

(57) ABSTRACT

A gaming machine comprises a reel strip comprising a plurality of trigger symbols, stack symbols, wild symbols and standard symbols, a symbol selector for selecting a plurality of symbols from the reel strip to be displayed on a display during play of a base game, wherein in the base game, said wild symbols substitute for only stack symbols and standard symbols, an outcome evaluator for monitoring play of the game, wherein when a predefined number of trigger symbols is selected for display, a plurality of feature games are triggered, and an interface for receiving a selection of one of the plurality of triggered feature games to play. In response to said selection and before initiating play of the selected feature game, the symbol selector selects a first of the plurality of standard symbols in the reel strip to be stacked such that a plurality of the selected first standard symbols are arranged adjacent each other on the reel strip, and b) a first of the plurality of stack symbols in the reel strip, the plurality of selected first standard symbols being transformed into the selected first stack symbol.

28 Claims, 14 Drawing Sheets

METHOD AND SYSTEM FOR PROVIDING A FEATURE GAME

RELATED APPLICATIONS

This application claims priority to Australian Provisional Patent Application No. 2014903102 having an International filing date of Aug. 10, 2014, which is incorporated herein by reference in its entirety.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

In existing gaming systems, feature games may be triggered for players in addition to the base game. A feature game gives players an additional opportunity to win prizes, or the opportunity to win larger prizes, than would otherwise be available in the base game. Feature games can also offer altered game play to enhance player enjoyment.

While such gaming systems provide players with enjoyment, a need exists for alternative methods to provide feature games in gaming systems, and for a larger variety of types of feature games.

BRIEF SUMMARY OF THE INVENTION

According to one aspect of the invention there is provided a gaming machine comprising:

a reel strip comprising a plurality of trigger symbols, stack symbols, wild symbols and standard symbols;

a symbol selector for selecting a plurality of symbols from the reel strip to be displayed on a display during play of a base game, wherein in the base game, said wild symbols substitute for only stack symbols and standard symbols;

an outcome monitor for monitoring play of the game, wherein when a predefined number of trigger symbols is selected for display, a plurality of feature games are triggered; and an interface for receiving a selection of one of the plurality of triggered feature games to play, wherein in response to said selection and before initiating play of the selected feature game, the symbol selector selects:

a) a first of the plurality of standard symbols in the reel strip to be stacked such that a plurality of the selected first standard symbols are arranged adjacent each other on the reel strip; and b) a first of the plurality of stack symbols in the reel strip, the plurality of selected first standard symbols being transformed into the selected first stack symbol.

In an embodiment, the return to player (RTP) of the gaming machine changes based on which of the plurality of feature games is selected for play. In an alternative embodiment, the RTP of the gaming machine remains constant regardless of which of the plurality of feature games is selected for play.

In an embodiment a first of the plurality of feature games comprises a plurality of award modifiers that are arranged on the display in respective ones of a plurality of modifier positions located adjacent each other. One of the plurality of modifier positions is selectively emphasised on the display, thereby to indicate that the award modifier corresponding to the emphasised modifier position has been activated. For each round of play of the first feature game that is determined to be a losing round, another of the plurality of modifier positions is selectively emphasised.

In this embodiment, an award is associated with each combination of symbols that is a predefined winning symbol combination, and before any award is paid, the award is modified by the award modifier that is emphasised when the award is won. Furthermore, at least one of the plurality of award modifiers comprises an award multiplier.

In an embodiment, a second of the plurality of feature games comprises adding a first predefined number of stack symbols to the reel strip prior to initiating play of the second feature game. The second feature game further comprises a counter, wherein for each round of play of the second feature game, the counter is incremented by a predefined number for each time a trigger symbol is selected for display. When the counter reaches a predefined threshold, a second predefined number of stack symbols is added to the reel strip.

In an embodiment, a third of the plurality of feature games comprises adding a predefined number of stack symbols to the reel strip and transforming said plurality of stack symbols into wild symbols prior to initiating play of the third feature game. For each round of play of the third feature game, the wild symbol substitutes for the trigger symbols in addition to the standard symbols and stack symbols.

According to another aspect of the invention there is provided a method of gaming on a gaming machine, the method comprising the steps of:

selecting using a symbol selector a plurality of symbols from the reel strip to be displayed on a display during play of a base game, the reel strip comprising a plurality of trigger symbols, stack symbols, wild symbols and standard symbols, wherein in the base game, said wild symbols substitute for only stack symbols and standard symbols;

monitoring the symbols selected for display using an outcome evaluator, wherein when a predefined number of trigger symbols is selected for display, a plurality of feature games are triggered; and receiving a selection using an interface one of the plurality of triggered feature games to play, wherein in response to said selecting and before initiating play of the selected feature game, the symbol selector selects:

a) a first of the plurality of standard symbols in the reel strip to be stacked such that a plurality of the selected first symbols are arranged adjacent each other on the reel strip; and b) a first of the plurality of stack symbols in the reel strip, the plurality of selected first symbols being transformed into the selected first stack symbol.

According to another aspect the invention, there is provided computer program code which when executed by components of a controller of a gaming system implements a method comprising the steps of:

selecting using a symbol selector a plurality of symbols from the reel strip to be displayed on a display during play of a base game, the reel strip comprising a plurality of trigger symbols, stack symbols, wild symbols and standard symbols, wherein in the base game, said wild symbols substitute for only stack symbols and standard symbols;

monitoring the symbols selected for display using an outcome evaluator, wherein when a predefined number of trigger symbols is selected for display, a plurality of feature games are triggered; and receiving a selection using an interface one of the plurality of triggered feature games to play, wherein in response to said selecting and before initiating play of the selected feature game, the symbol selector selects:

a) a first of the plurality of standard symbols in the reel strip to be stacked such that a plurality of the selected first symbols are arranged adjacent each other on the reel strip; and b) a first of the plurality of stack symbols in the reel strip, the plurality of selected first symbols being transformed into the selected first stack symbol.

BRIEF DESCRIPTION OF SEVERAL VIEWS OF THE DRAWINGS

Features and advantages of certain embodiments of the present invention will become apparent from the following description of embodiments thereof, by way of example only, with reference to the accompanying drawings, in which.

Figure 1:
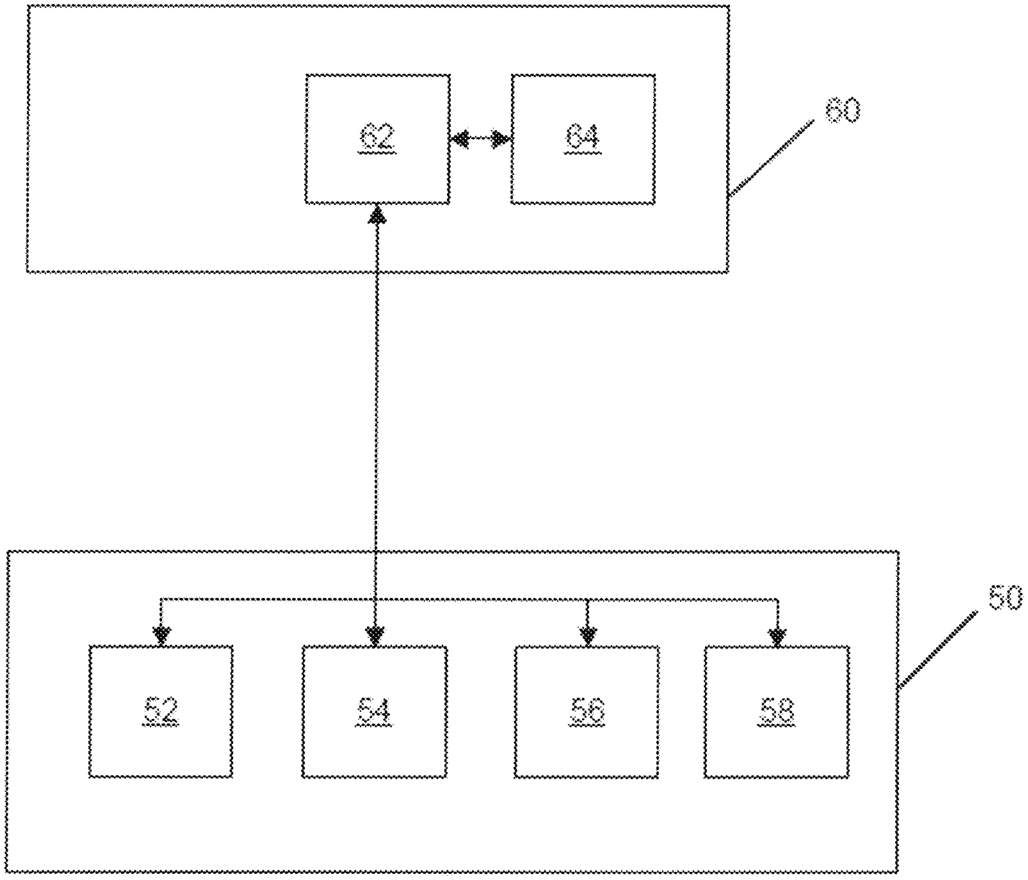
FIG. 1 is a block diagram of the core components of a gaming system.

The foregoing summary, as well as the following detailed description of certain embodiments of the present invention, will be better understood when read in conjunction with the appended drawings. For the purpose of illustrating the invention, certain embodiments are shown in the drawings. It should be understood, however, that the present invention is not limited to the arrangements and instrumentality shown in the attached drawings.

DETAILED DESCRIPTION OF THE INVENTION

Referring to the drawings, there are shown example embodiments of gaming systems which are arranged to implement a base game, from which is triggered a plurality of features games. In these embodiments, there are three feature games that may be selectively initiated, and for each of the three feature games the gaming system modifies the base game in a specific way. The invention is not limited to triggering only three feature games, however. In other embodiments, any number of feature games may be selected from in response to the gaming system determining the presence of a trigger during play of the base game.

In the preferred embodiment, the gaming system is configured so that the return to player (RTP) remains constant regardless of which of the three feature games are selected. However in alternative embodiments, the overall RTP of the gaming system may be altered based on which of the feature games is selected for play.

General Construction of Gaming System

The gaming system can take a number of different forms. In a first form, a stand alone gaming machine is provided wherein all or most components required for implementing the game are present in a player operable gaming machine.

In a second form, a distributed architecture is provided wherein some of the components required for implementing the game are present in a player operable gaming machine and some of the components required for implementing the game are located remotely relative to the gaming machine. For example, a “thick client” architecture may be used wherein part of the game is executed on a player operable gaming machine and part of the game is executed remotely, such as by a gaming server; or a “thin client” architecture may be used wherein most of the game is executed remotely such as by a gaming server and a player operable gaming machine is used only to display audible and/or visible gaming information to the player and receive gaming inputs from the player.

However, it will be understood that other arrangements are envisaged. For example, an architecture may be provided wherein a gaming machine is networked to a gaming server and the respective functions of the gaming machine and the gaming server are selectively modifiable. For example, the gaming system may operate in stand alone gaming machine mode, “thick client” mode or “thin client” mode depending on the game being played, operating conditions, and so on. Other variations will be apparent to persons skilled in the art.

Irrespective of the form, the gaming system 1 has several core components. At the broadest level, the core components are a player interface 50 and a game controller 60 as illustrated in FIG. 1. The player interface is arranged to enable manual interaction between a player and the gaming system and for this purpose includes the input/output components required for the player to enter instructions to play the game and observe the game outcomes.

Components of the player interface may vary from embodiment to embodiment but will typically include a credit mechanism 52 to enable a player to input credits and receive payouts, one or more displays 54, a game play mechanism 56 including one or more input devices that enable a player to input game play instructions (e.g. to place a wager), and one or more speakers 58.

The game controller 60 is in data communication with the player interface and typically includes a processor 62 that processes the game play instructions in accordance with game play rules and outputs game play outcomes to the display. Typically, the game play rules are stored as program code in a memory 64 but can also be hardwired. Herein the term “processor” is used to refer generically to any device that can process game play instructions in accordance with game play rules and may include: a microprocessor, microcontroller, programmable logic device or other computational device, a general purpose computer (e.g. a PC) or a server. That is a processor may be provided by any suitable logic circuitry for receiving inputs, processing them in accordance with instructions stored in memory and generating outputs (for example on the display). Such processors are sometimes also referred to as central processing units (CPUs). Most processors are general purpose units, however, it is also know to provide a specific purpose processor using an application specific integrated circuit (ASIC) or a field programmable gate array (FPGA).

Figure 2:
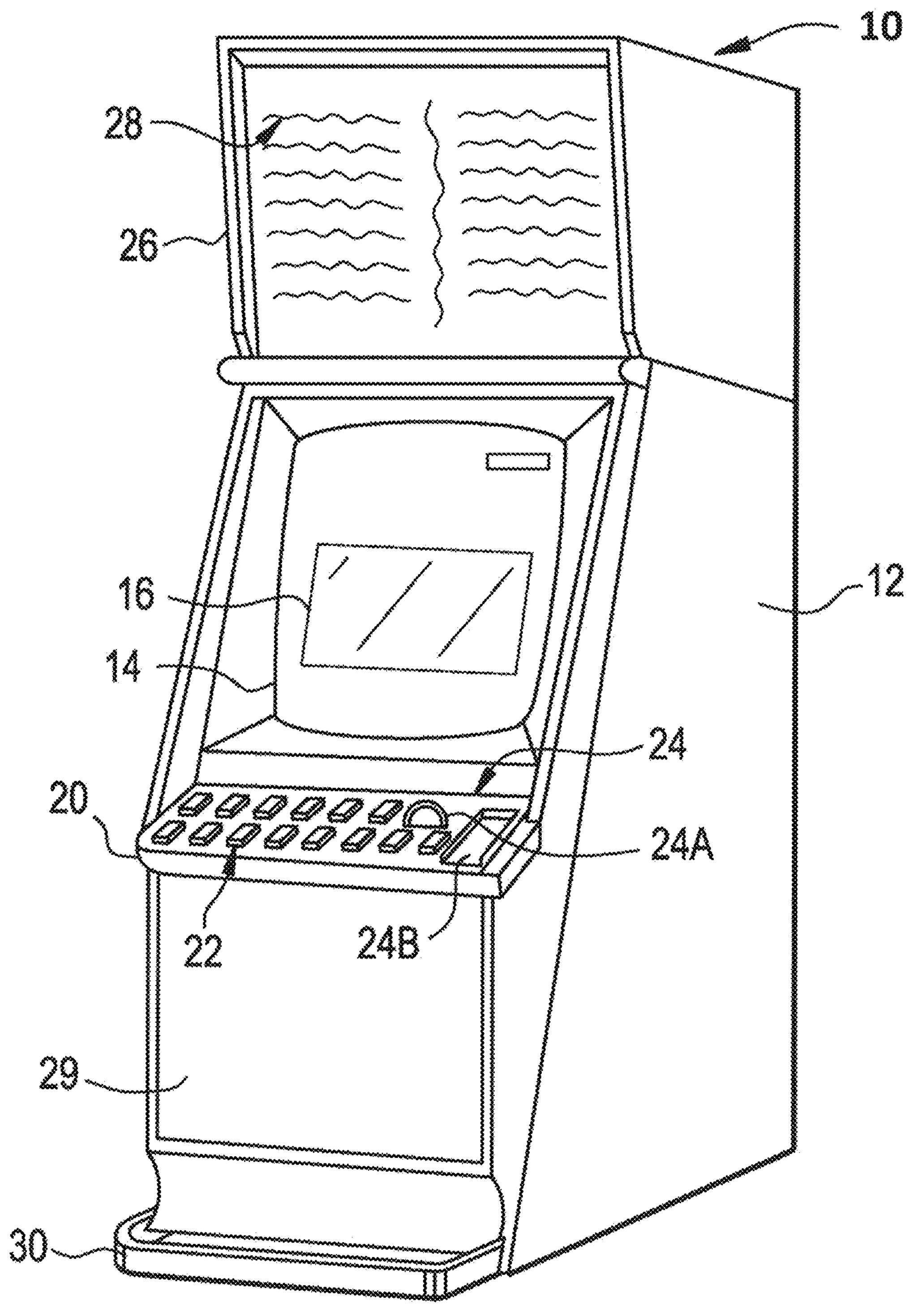
FIG. 2 is a perspective view of a stand alone gaming machine.

A gaming system in the form of a stand alone gaming machine 10 is illustrated in FIG. 2. The gaming machine 10 includes a console 12 having a display 14 on which are displayed representations of a game 16 that can be played by a player. A mid-trim 20 of the gaming machine 10 houses a bank of buttons 22 for enabling a player to interact with the gaming machine, in particular during game play. The mid-trim 20 also houses a credit input mechanism 24 which in this example includes a coin input chute 24A and a bill collector 24B. Other credit input mechanisms may also be employed, for example, a card reader for reading a smart card, debit card or credit card. Other gaming machines may configure for ticket in such that they have a ticket reader for reading tickets having a value and crediting the player based on the face value of the ticker. A player marketing module (not shown) having a reading device may also be provided for the purpose of reading a player tracking device, for example as part of a loyalty program. The player tracking device may be in the form of a card, flash drive or any other portable storage medium capable of being read by the reading device. In some embodiments, the player marketing module may provide an additional credit mechanism, either by transferring credits to the gaming machine from credits stored on the player tracking device or by transferring credits from a player account in data communication with the player marketing module.

A top box 26 may carry artwork 28, including for example pay tables and details of bonus awards and other information or images relating to the game. Further artwork and/or information may be provided on a front panel 29 of the console 12. A coin tray 30 is mounted beneath the front panel 29 for dispensing cash payouts from the gaming machine 10.

The display 14 shown in FIG. 2 is in the form of a video display unit, particularly a cathode ray tube screen device. Alternatively, the display 14 may be a liquid crystal display, plasma screen, any other suitable video display unit, or the visible portion of an electromechanical device. The top box 26 may also include a display, for example a video display unit, which may be of the same type as the display 14, or of a different type.

Figure 3:
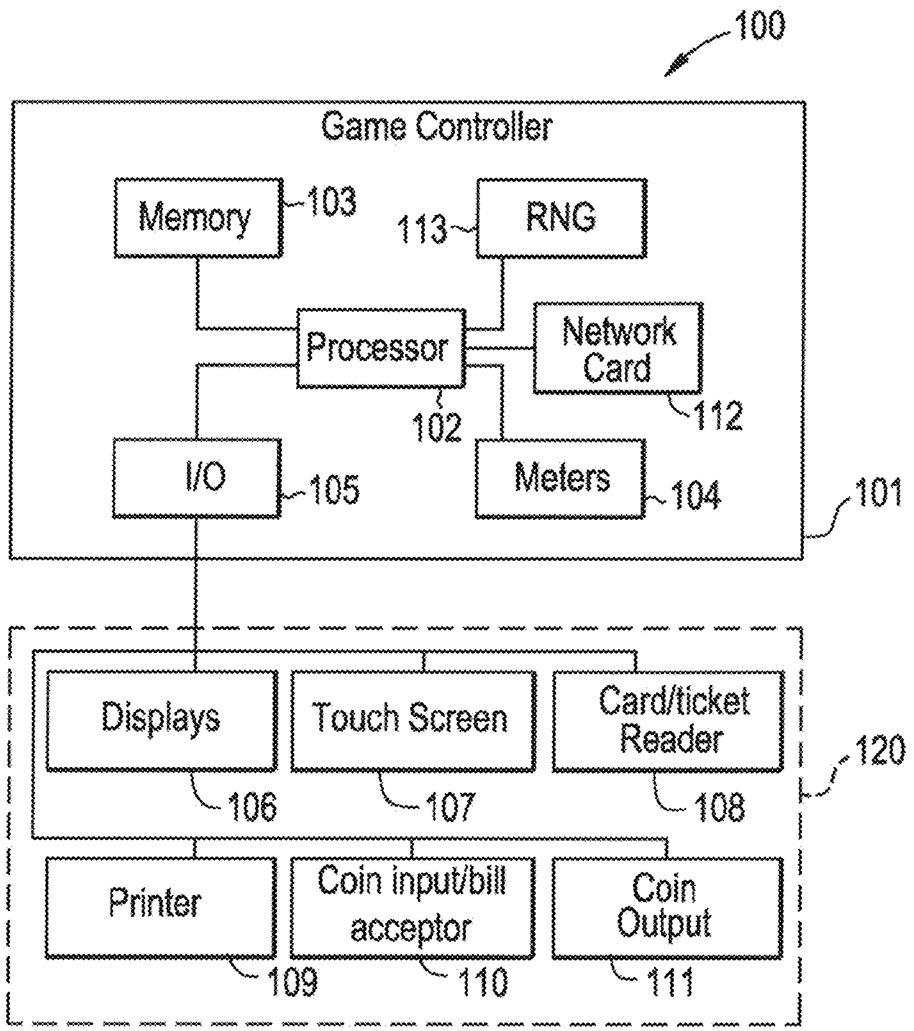
FIG. 3 is a block diagram of the functional components of a gaming machine.

FIG. 3 shows a block diagram of operative components of a typical gaming machine which may be the same as or different to the gaming machine of FIG. 2.

The gaming machine 10 includes a game controller 101 having a processor 102 mounted on a circuit board. Instructions and data to control operation of the processor 102 are stored in a memory 103, which is in data communication with the processor 102. Typically, the gaming machine 10 will include both volatile and non-volatile memory and more than one of each type of memory, with such memories being collectively represented by the memory 103.

The gaming machine has hardware meters 104 for purposes including ensuring regulatory compliance and monitoring player credit, an input/output (I/O) interface 105 for communicating with peripheral devices of the gaming machine 100. The input/output interface 105 and/or the peripheral devices may be intelligent devices with their own memory for storing associated instructions and data for use with the input/output interface or the peripheral devices. A random number generator module 113 generates random numbers for use by the processor 102. Persons skilled in the art will appreciate that the reference to random numbers includes pseudo-random numbers.

In the example shown in FIG. 3, a player interface 120 includes peripheral devices that communicate with the game controller 101 including one or more displays 106, a touch screen and/or buttons 107 (which provide a game play mechanism), a card and/or ticket reader 108, a printer 109, a bill acceptor and/or coin input mechanism 110 and a coin output mechanism 111. Additional hardware may be included as part of the gaming machine 100, or hardware may be omitted as required for the specific implementation. For example, while buttons or touch screens are typically used in gaming machines to allow a player to place a wager and initiate a play of a game any input device that enables the player to input game play instructions may be used. For example, in some gaming machines a mechanical handle is used to initiate a play of the game. Persons skilled in the art will also appreciate that a touch screen can be used to emulate other input devices, for example, a touch screen can display virtual buttons which a player can "press" by touching the screen where they are displayed.

In addition, the gaming machine 100 may include a communications interface, for example a network card 112. The network card may, for example, send status information, accounting information or other information to a bonus controller, central controller, server or database and receive data or commands from the bonus controller, central controller, server or database. In embodiments employing a player marketing module, communications over a network may be via player marketing module—i.e. the player marketing module may be in data communication with one or more of the above devices and communicate with it on behalf of the gaming machine.

Figure 4:
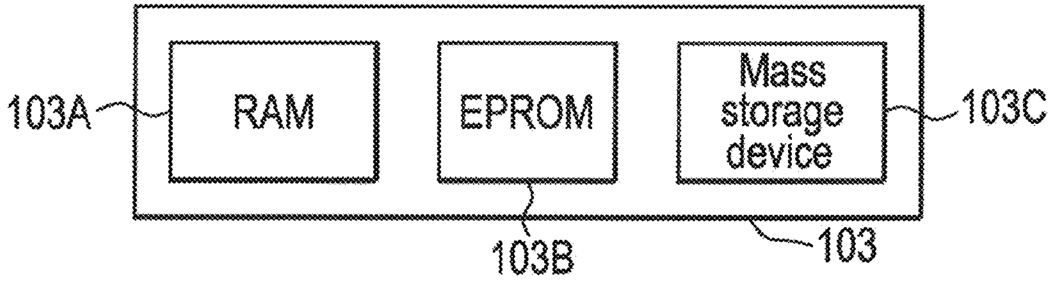
FIG. 4 is a schematic diagram of the functional components of a memory.

FIG. 4 shows a block diagram of the main components of an exemplary memory 103. The memory 103 includes RAM 103A, EPROM 103B and a mass storage device 103C. The RAM 103A typically temporarily holds program files for execution by the processor 102 and related data. The EPROM 103B may be a boot ROM device and/or may contain some system or game related code. The mass storage device 103C is typically used to store game programs, the integrity of which may be verified and/or authenticated by the processor 102 using protected code from the EPROM 103B or elsewhere.

It is also possible for the operative components of the gaming machine 100 to be distributed, for example input/output devices 106,107,108,109,110,111 to be provided remotely from the game controller 101.

Figure 5:
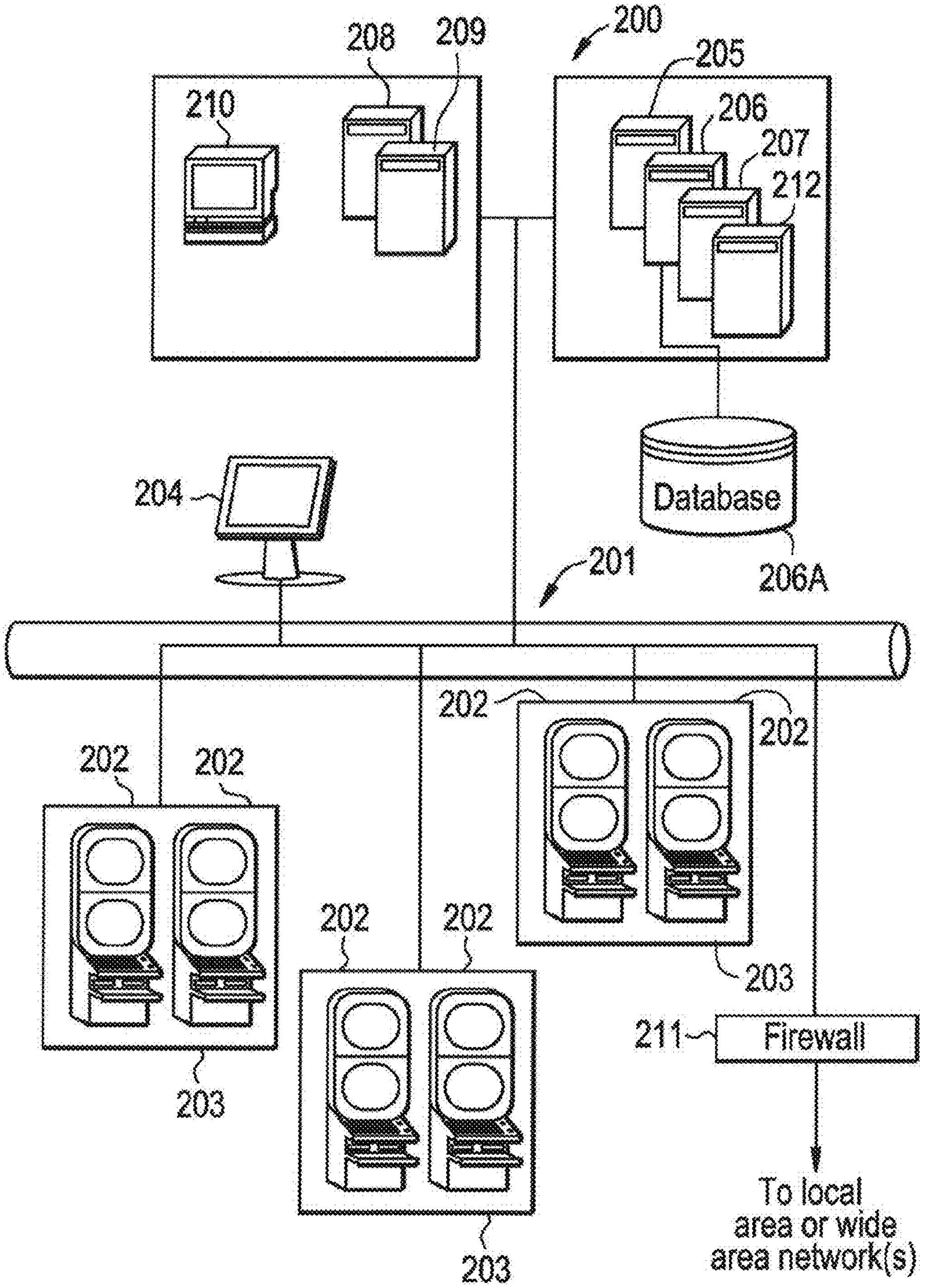
FIG. 5 is a schematic diagram of a network gaming system.

FIG. 5 shows a gaming system 200 in accordance with an alternative embodiment. The gaming system 200 includes a network 201, which for example may be an Ethernet network. Gaming machines 202, shown arranged in three banks 203 of two gaming machines 202 in FIG. 5 are connected to the network 201. The gaming machines 202 provide a player operable interface and may be the same as the gaming machines 10,100 shown in FIGS. 2 and 3, or may have simplified functionality depending on the requirements for implementing game play. While banks 203 of two gaming machines are illustrated in FIG. 5, banks of one, three or more gaming machines are also envisaged.

One or more displays 204 may also be connected to the network 201. For example, the displays 204 may be associated with one or more banks 203 of gaming machines. The displays 204 may be used to display representations associated with game play on the gaming machines 202, and/or used to display other representations, for example promotional or informational material.

In a thick client embodiment, game server 205 implements part of the game played by a player using a gaming machine 202 and the gaming machine 202 implements part of the game. With this embodiment, as both the game server and the gaming device implement part of the game, they collectively provide a game controller. A database management server 206 may manage storage of game programs and associated data for downloading or access by the gaming devices 202 in a database 206A. Typically, if the gaming system enables players to participate in a Jackpot game, a Jackpot server 207 will be provided to perform accounting functions for the Jackpot game. A loyalty program server 212 may also be provided.

In a thin client embodiment, game server 205 implements most or all of the game played by a player using a gaming machine 202 and the gaming machine 202 essentially provides only the player interface. With this embodiment, the game server 205 provides the game controller. The gaming machine will receive player instructions, pass these to the game server which will process them and return game play outcomes to the gaming machine for display. In a thin client embodiment, the gaming machines could be computer terminals, e.g. PCs running software that provides a player interface operable using standard computer input and output components. Other client/server configurations are possible, and further details of a client/server architecture can be found in WO 2006/052213 and PCT/SE2006/000559, the disclosures of which are incorporated herein by reference.

Servers are also typically provided to assist in the administration of the gaming network 200, including for example a gaming floor management server 208, and a licensing server 209 to monitor the use of licenses relating to particular games. An administrator terminal 210 is provided to allow an administrator to run the network 201 and the devices connected to the network.

The gaming system 200 may communicate with other gaming systems, other local networks, for example a corporate network, and/or a wide area network such as the Internet, for example through a firewall 211.

Persons skilled in the art will appreciate that in accordance with known techniques, functionality at the server side of the network may be distributed over a plurality of different computers. For example, elements may be run as a single "engine" on one server or a separate server may be provided. For example, the game server 205 could run a random generator engine. Alternatively, a separate random number generator server could be provided. Further, persons skilled in the art will appreciate that a plurality of game servers could be provided to run different games or a single game server may run a plurality of different games as required by the terminals.

Further Detail of Gaming System

The player operates the game play mechanism 56 to specify a wager and hence the win entitlement which will be evaluated for this play of the game and initiates a play of the game. Persons skilled in the art will appreciate that a player's win entitlement will vary from game to game dependent on player selections. In most spinning reel games, it is typical for the player's entitlement to be affected by the amount they wager and selections they make (i.e. the nature of the wager). For example, a player's win entitlement may be based on how many lines they play in each game—e.g. a minimum of one line up to the maximum number of lines allowed by the game (noting that not all permutations of win lines may be available for selection) and how much they wager per line. Such win lines are typically formed by a combination of symbol display positions, one from each reel, the symbol display positions being located relative to one another such that they form a line.

In many games, the player's win entitlement is not strictly limited to the lines they have selected, for example, "scatter" pays are awarded independently of a player's selection of paylines and are an inherent part of the win entitlement.

Persons skilled in the art will appreciate that in other embodiments, the player may obtain a win entitlement by selecting a number of reels to play and an amount to wager per reel. Such games are marketed under the trade name "Reel Power" by Aristocrat Leisure Industries Pty Ltd. The selection of the reel means that each displayed symbol of the reel can be substituted for a symbol at one or more designated display positions. In other words, all symbols displayed at symbol display positions corresponding to a selected reel can be used to form symbol combinations with symbols displayed at a designated, symbol display positions of the other reels. For example, if there are five reels and three symbol display positions for each reel such that the symbol display positions comprise three rows of five symbol display positions, the symbols displayed in the centre row are used for non-selected reels. As a result, the total number of ways to win is determined by multiplying the number of active display positions of each reel, the active display positions being all display positions of each selected reel and the designated display position of the non-selected reels. As a result for five reels and fifteen display positions there are 243 ways to win.

Figure 6:
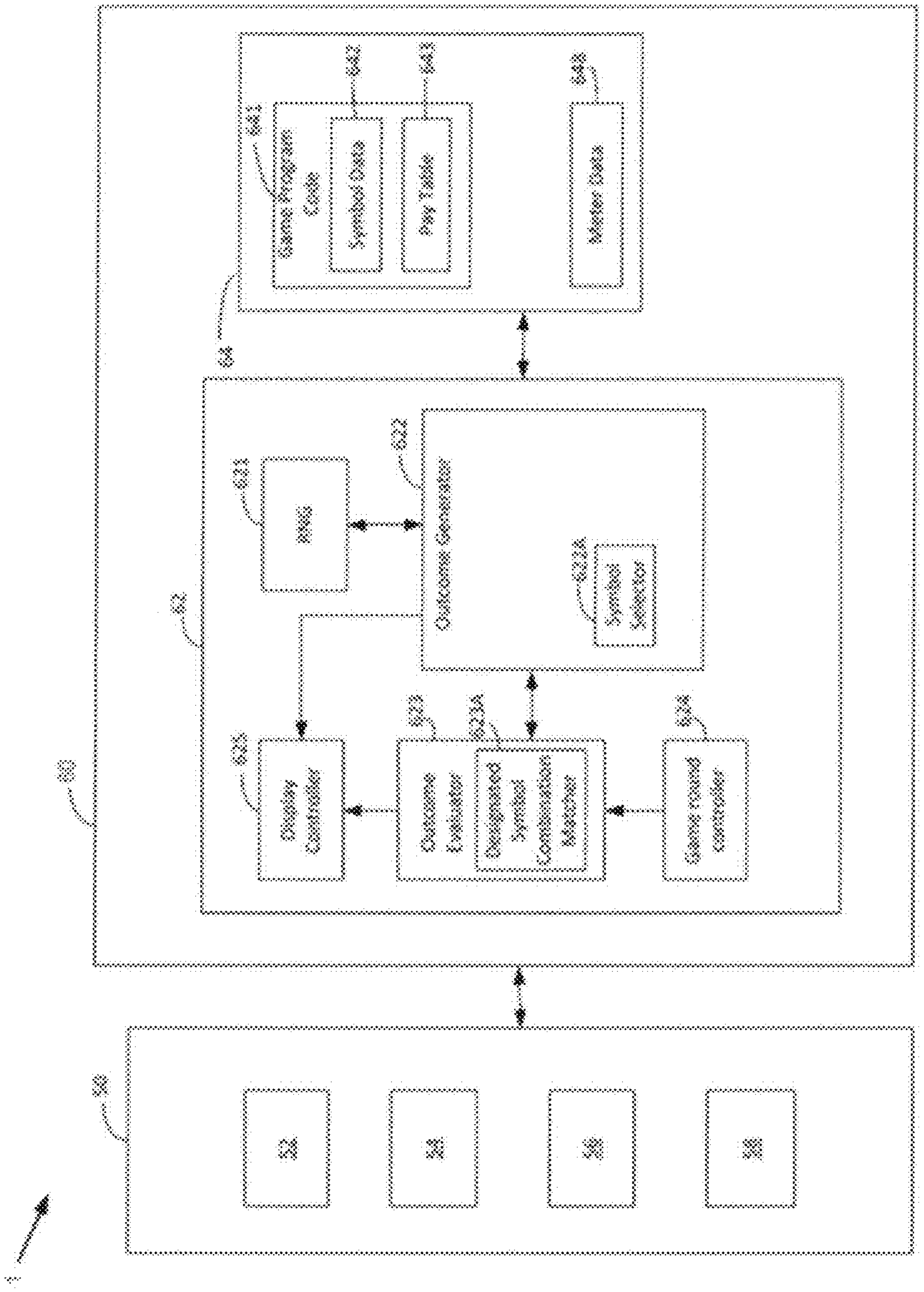
FIG. 6 is a further block diagram of a gaming system.

In FIG. 6, the processor 62 of game controller 60 of gaming system 1 is shown implementing a number of modules based on game program code 641 stored in memory 64. Persons skilled in the art will appreciate that various of the modules could be implemented in some other way, for example by a dedicated circuit.

These modules include the outcome generator 622 which operates in response to the player's operation of game play mechanism 56 to place a wager and initiate a play of the game and generates a game outcome which will then be evaluated by outcome evaluator 623. The first part of forming the game outcome is for a symbol selector 622A to select symbols from a set of symbols specified by symbol data 641 using random number generator 621. The selected symbols are advised to the display controller 624 which causes them to be displayed as a symbol display on display 54 at a set of display positions.

In the embodiment described below, the display positions of the symbol display are arranged in a rectangular matrix comprising a plurality of columns and a plurality of rows. However, in other arrangements are known in the gaming industry and could be employed in embodiments of the invention. For example, in some arrangements there are more symbols in some columns than other, such as 3-4-3-4-3 arrangement of seventeen display positions corresponding to respective ones of five reels. In such arrangements, the columns of four symbols can be arranged so that they are off-set or staggered relative to the columns having two symbols so that the middle two symbols in the columns of four symbols share boundaries with two symbols of each neighbouring reel.

In one embodiment, the outcome generator 622 is arranged to generate one or more game outcomes. All outcomes are displayed on display 54 under control of display controller 625. One example of generating a first game outcome is for the symbol selector 622A to select symbols for display from symbol data 641 in the form of a plurality of symbol sets corresponding to respective ones of a plurality of reels. The symbol sets specify a sequence of symbols for each reel such that the symbol selector 622A can select all of the symbols to be displayed for each reel by selecting a stopping position in the sequence. In one example, three symbols of each of five reels may be displayed such that symbols are displayed at fifteen display positions on display 54. It is known to use a probability table stored in memory 64 to vary the odds of a particular stop position being selected. Other techniques can be used to control the odds of particular outcomes occurring to thereby control the return to player of the game.

Once the symbols are selected by the symbol selector 622A of outcome generator 622, they are evaluated by the outcome evaluator 623 to determine whether they include any winning combinations in pay table 643 to determine whether to make an award. Any award is added to the win meter maintained in memory 64 as part of meter data 648. The meter data 648 also includes the current value of a credit meter. The current values of the credit and win meters are displayed on display 54 by the display controller 625. Wins are transferred from the win meter to the credit meter at the end of a play of the game. Wagers are deducted from the credit meter when play of a game commences.

Figure 7:
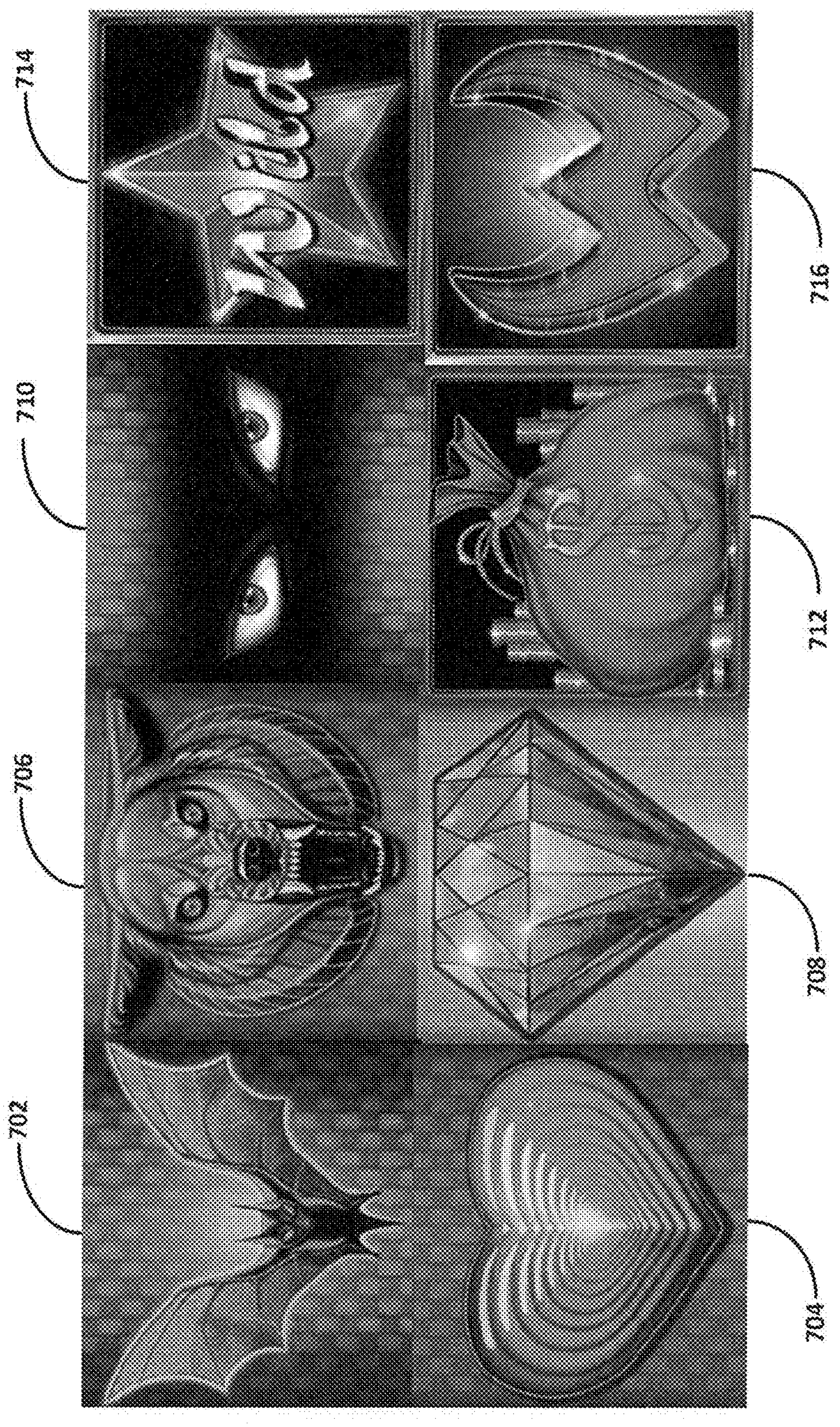
FIG. 7 is a representation of the symbols used in a base game of the gaming system of FIG. 1.

In one embodiment, the set of symbols defined by symbol data 641 comprises a plurality of: standard symbols, stack symbols, trigger symbols and wild symbols. Standard symbols will be readily known by any skilled in the art and may commonly include fruits, bells, stars and symbols derived from common playing cards. Stack symbols, in this embodiment, are symbols which can be rearranged into positions one after another on the reel strip. Examples of stack symbols are illustrated in FIG. 7, for example: Bat symbol 702; Heart symbol 704; Wolf symbol 706; Diamond symbol 708; Eyes symbol 710 and Money bag symbol 712. Wild symbol 714 and trigger symbol 716 are also shown.

During play of the base game, symbol selector 622A selects a plurality of symbols from the set of symbols for each reel strip to be displayed on the display 16. Note that in this embodiment, in the base game, Wild symbol 714 substitutes for only stack symbols 702 to 712 and standard symbols, but not for trigger symbol 716. That is, the Wild symbol 714 cannot contribute to a trigger condition being met.

Outcome evaluator 623 monitors play of the base game, and if a predefined number of trigger symbols is selected for display, a plurality of feature games are triggered for selection.

Once the plurality of feature games is triggered, the interface 50 is configured to receive a selection of one of the feature games to play. In one embodiment, in response to one of the feature games being selected and before initiating play of that selected feature game, the symbol selector selects:

a first of the plurality of standard symbols in the reel strip to be stacked such that a plurality of the selected first standard symbols are arranged adjacent each other on at least one of the reel strips; and a first of the plurality of stack symbols in the respective reel strip(s), the plurality of selected first standard symbols being transformed into the selected first stack symbol.

That is, in one embodiment, one of the plurality of standard symbols is first selected and rearranged by the game controller 60 to occupy positions one after another to form a stack on the reel strip. Once the stack has been formed, one of the stack symbols is selected by the game controller and the rearranged standard symbols are then transformed by the game controller into the stack symbol. For example, if the stack is selected to be Bat symbol 702, then the rearranged standard symbols are transformed into Bat symbol 702. It will be appreciated that in one embodiment the game controller 60 may employ the random number generator 621 to select the standard symbol to be rearranged and to select the stack symbol. Depending on the embodiment, the chances of selecting respective symbols may be equal or weighted relative to one another.

In other embodiments, the steps of selecting, rearranging and transforming the standard symbol are performed by the game controller as part of the selected feature game. That is, after the selected feature game has been initiated by the game controller. Furthermore, in yet other embodiments, more than one standard symbol and/or stack symbol may be selected by the game controller.

In the embodiment, all game outcomes are also evaluated to determine whether they include a designated symbol combination. To this end, outcome evaluator 623 includes a designated symbol combination matcher 623A which compares the symbols to designated winning symbol combinations 645 stored in the memory 64. Depending on the embodiment, the designated winning symbol combinations may be all winning combinations in the pay table, a subset of the winning combinations in the pay table, or only those winning combinations which are completed using stack symbols 702-712, Wild symbol 714 and/or trigger symbol 716. In yet another embodiment, the designated winning symbol combinations may be only winning combinations which are completed using a mixture of stack symbols, wild symbols and trigger symbols.

In addition to triggering the plurality of features using trigger symbols 716, some embodiments provide for a mystery trigger, which is triggered at random by the gaming system. The mystery trigger in this embodiment will trigger initiation of a mystery feature game, rather than one of the selectable feature games described above. In other embodiments, the mystery trigger may trigger one of the selectable feature games, or may trigger the opportunity to select one of a plurality of feature games that may be the same as or different to the selectable feature games.

In some embodiments, the mystery trigger may be triggered at the same time as trigger symbols 716. In that case, in one embodiment the game controller 60 is configured to initiate the mystery trigger first and then to initiate one of the selectable feature games immediately afterwards. Another embodiment combines the feature such that the mystery feature game becomes selectable along with the other feature games. A further embodiment initiates both features simultaneously, for example by executing the mystery feature game in the background. Other ways of handling this "double trigger" situation should be apparent to the skilled addressee.

In an embodiment having 5 reels, bonus prizes may be paid by the gaming system for 3, 4 or 5 stacks (left to right) of a selected stack symbol 702-712. The amount of the bonus prize is displayed as an incrementing amount on the display, and different incrementing bonus amounts are respectively associated with each additional stack. Thus a first bonus amount is associated for 3 stacks, a second bonus amount is associated for 4 stacks and a third bonus amount is associated for 5 stacks.

In one example, the bonus amounts start incrementing when the 3, 4 or 5 stack criteria is only partially fulfilled. For example, using the money bag symbol 712, when 2 stacks of money bags appear the first bonus prize amount (which corresponds to the prize for 3 stacks of money bags) starts to increment while the other reels are spinning. While the first bonus prize is incrementing, the third reel may be highlighted or otherwise emphasised in some embodiments. Similarly, reels 4 and 5 may also be highlighted as they spin when 3 or 4 stacks of money bags appear respectively and the second or third bonus amount is being incremented. This embodiment is described in greater detail with reference to FIG. 11 below.

Figure 8:
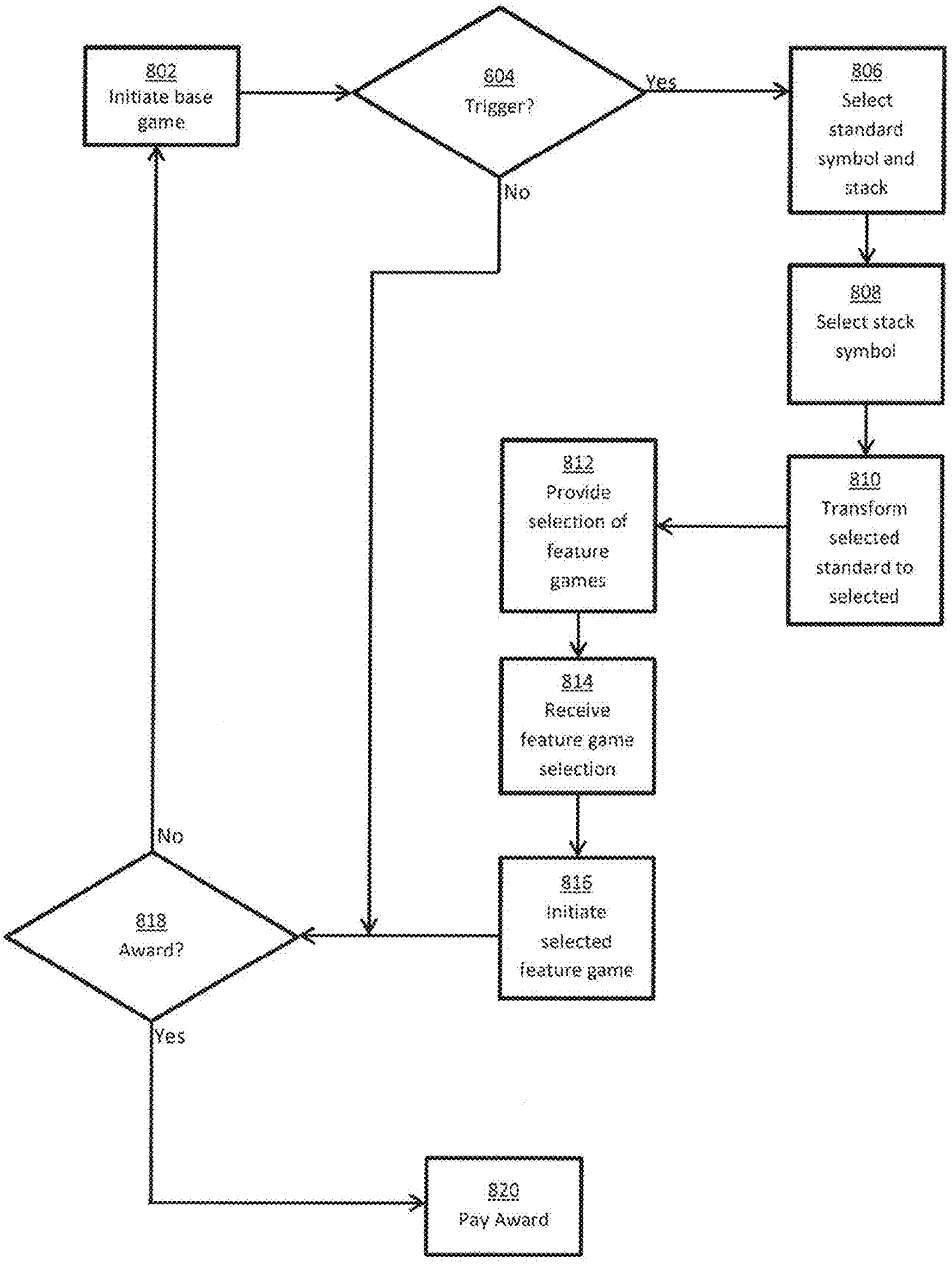
FIG. 8 is a flow diagram of the base game that uses the symbols of FIG. 7.

One embodiment of the above described system is shown in FIG. 8. In this embodiment, a player initiates the base game at step 802. During play of the base game, the game controller 60 monitors play and determines whether a trigger condition has been met at step 804. When the trigger condition is met, the game controller 60 initiates the feature sequence starting from step 806, which selects one of the standard symbols from the set of symbols and arranges the selected standard symbol into a stack on the reel strips. At step 808, game controller 60 selects one of the stack symbols and, at step 810, transforms the selected standard symbol into the selected stack symbol.

Once the symbols have been transformed, game controller 60 provides at step 812 a selection of the plurality of feature games on interface 50. In this embodiment, the number of feature games available for selection is three, and the three feature games are presented on an interface for the player to select.

In other embodiments, there may be any number of feature games as required by the game designer and/or player preference. Furthermore, the feature game to be played may be selected by the game controller 60, for example randomly or based on other predefined criteria.

In this embodiment, the feature games are implemented by the game controller such that selection of any of the feature games does not alter the RTP of the gaming machine 10. While the RTP remains constant, in this or further embodiments, the volatility of the gaming machine 10 can be altered. For example, one of the feature games awards prizes of lower magnitude more frequently while another of the feature games awards prizes of higher magnitude less frequently.

In other embodiments, depending on regulatory requirements in a respective jurisdiction, the RTP may be altered through the selection of the feature games.

Once the feature game selection is received at step 814, the selected feature game is initiated at step 816. Play of the selected feature game is monitored continually by game controller 60 at step 818, and when an award is determined to be payable it is paid at step 820.

Once play of the selected feature game is completed, and any awards are paid, the player may choose to continue playing the gaming machine 10 by again initiating a new game at step 802. Similarly, if a trigger condition has not been met at step 804, the player may also choose to continue playing the game by initiating a new game at step 802.

It should be noted that the order of the steps is intended to exemplify an embodiment of the invention, and should not be read as prescriptive. For example, the stacking and transformation steps 806 to 810 and the feature game selection steps 812 to 816 may be rearranged or may be interchanged as necessary to suit design requirements or player preference.

Figure 9A:
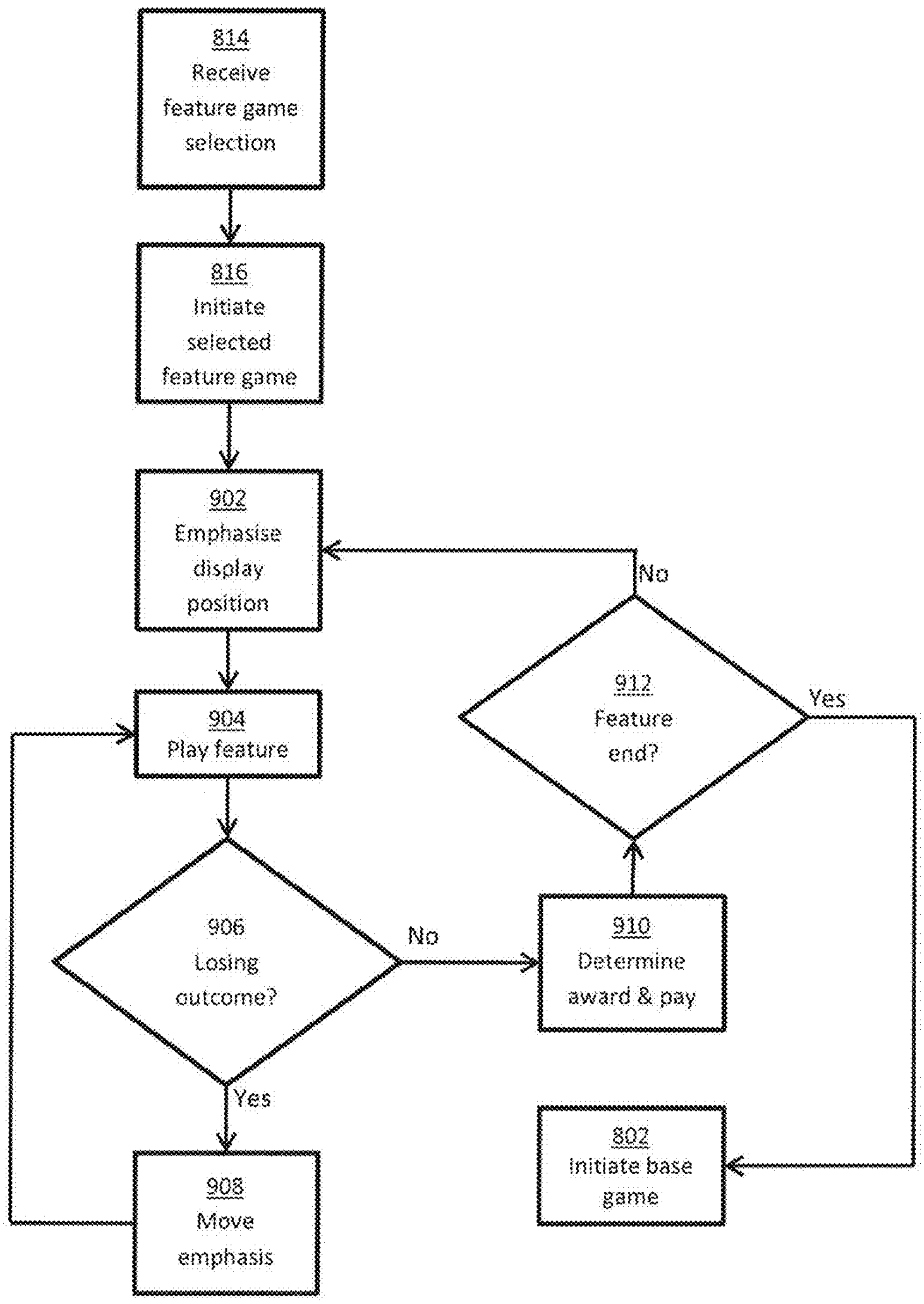
FIG. 9A is a flow diagram of a first feature game of the gaming system of FIG. 1.
Figure 9B:
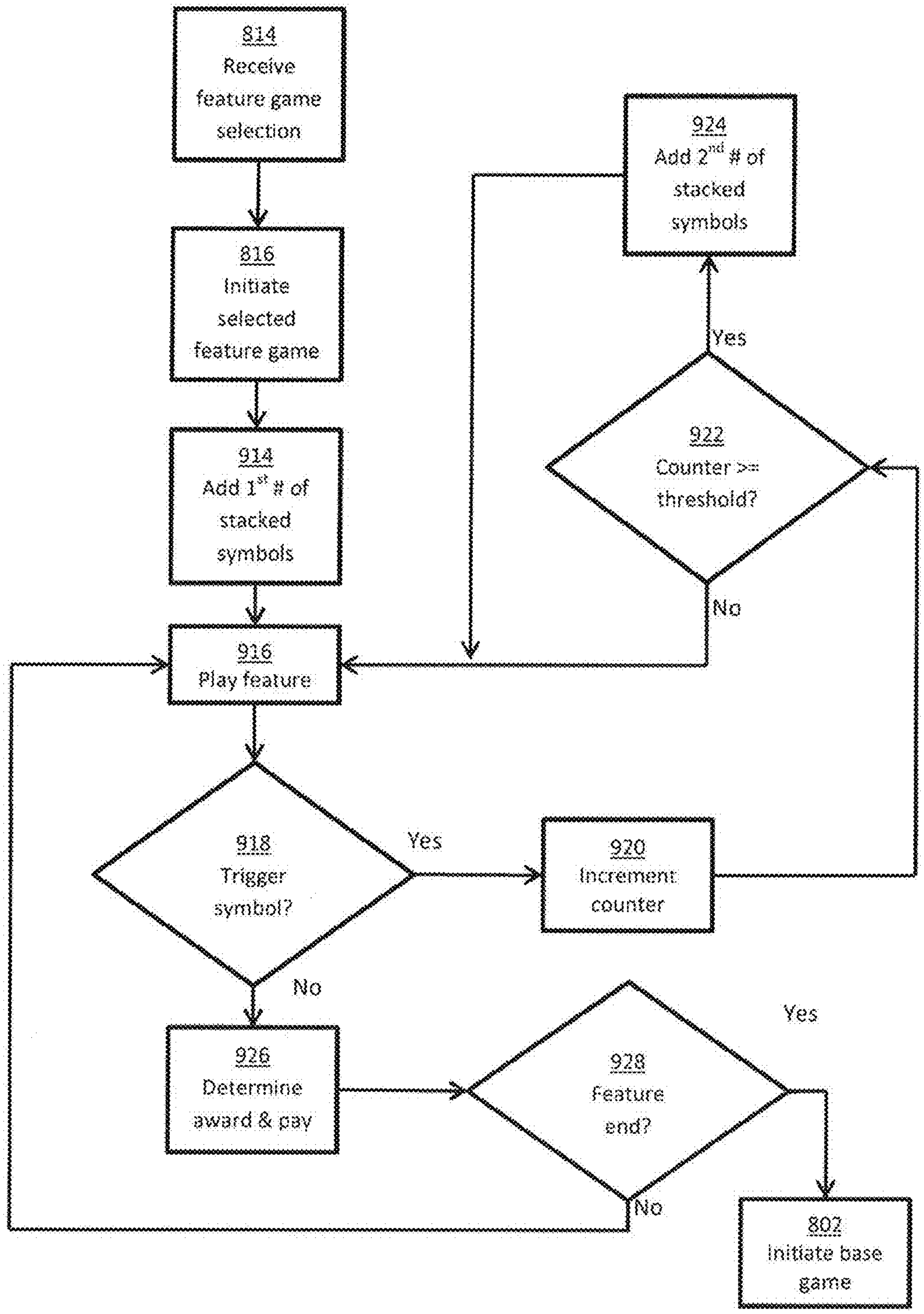
FIG. 9B is a flow diagram of a second feature game of the gaming system of FIG. 1.
Figure 9C:
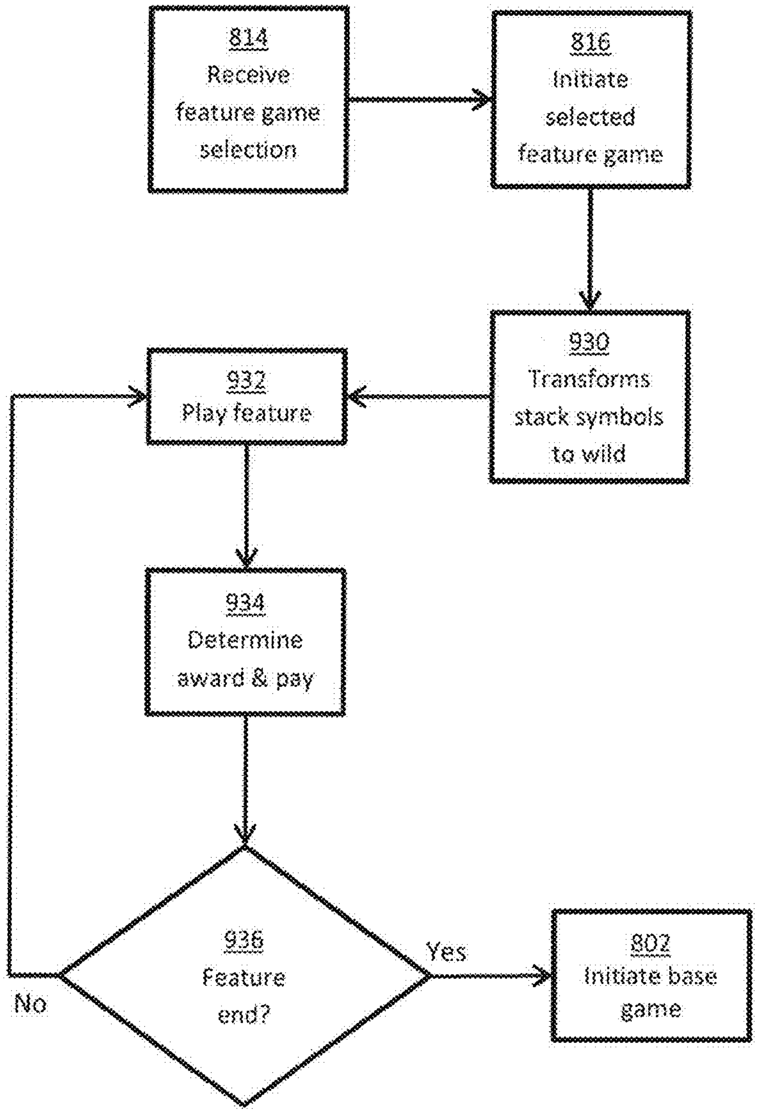
FIG. 9C is a flow diagram of the third feature game of the gaming system of FIG. 1.

Referring again to the drawings, FIGS. 9A to 9C show embodiments of the plurality of feature games that are available for selection in one embodiment. The first feature game is shown in the embodiment of FIG. 9A and comprises a plurality of multipliers which are arranged on the display 54 by the game controller in respective ones of a plurality of modifier positions located adjacent each other. In an embodiment, the modifier positions for the award multipliers are arranged side-by-side in the form of a meter, as will be described below with reference to the examples. However, it will be appreciated that modifier positions will be arranged differently in other embodiments.

When the first feature game is selected and initiated in steps 814 and 816, a first of the modifier positions is emphasised at step 902. In an embodiment, only one modifier position is emphasised, by the gaming machine highlighting the award multiplier displayed within the modifier position relative to the award multipliers displayed in the other modifier positions. In other embodiments, more than one modifier position may be emphasised, and the modifier positions may be emphasised in other ways. For example, the background of the modifier position may be highlighted or an additional symbol may be overlaid upon the emphasised position. In yet other examples, the modifier position may be emphasised by enlarging the position or by otherwise modifying the position and/or the award multiplier displayed within relative to the other modifier positions and award multipliers.

In one embodiment, as will described in greater detail with reference to FIG. 10C below, the modifier positions are indicated on top of the reels in the display. In that embodiment, a message 1004 indicates that the player needs to collect one more trigger symbol to trigger additional stack symbols.

In the FIG. 9A embodiment, the first feature game comprises a plurality of game rounds. For each game round, the game controller 60 determines the outcome of the round at step 906. If the outcome of the game round is a losing outcome, the emphasis of the award multiplier is moved from the first modifier position to a second modifier position. In this embodiment, the emphasis moves in only one direction—from left to right—one position at a time. However this should not be taken as prescriptive, and in other embodiments, emphasis can be moved in any direction and in any number of positions at a time. For example, the game controller 60 in one embodiment is adapted to determine the number of positions and the direction in which to move the emphasis, either randomly or based on a plurality of predefined criteria.

If the outcome of the game round is determined to be a winning outcome by the game controller the award payable is paid at step 910. As is known in the prior art, awards for each individual game round are determined by the game controller with reference to a predefined pay table. In this embodiment, the awards payable as defined by the predefined pay table are multiplied by the award multiplier that is displayed in the emphasised modifier position at the end of the game round.

In other embodiments, awards paid for individual game rounds are accumulated and the final award is determined by multiplying the accumulated award by the award multiplier that is displayed in the emphasised modifier position at the end of the first feature game as determined by the game controller 60 at step 912. Once the feature ends, the player may choose to play the gaming machine 10 again by initiating the base game at step 802.

An embodiment of the second feature game is shown in FIG. 9B. Once game selection and initiation has occurred at steps 814 and 816, a first predefined number of stack symbols are added to the reels at step 914. The first predefined number maybe any number, but in this embodiment, 30 stack symbols are added to the reel. The stack symbol to be added in this embodiment is selected from stack symbols 702-712 illustrated in FIG. 7.

Play of a first round of the second feature game commences at step 916, in which the outcome evaluator 623 determines whether at least one trigger symbol has been selected for display. If at least one trigger symbol has been selected as determined at step 918, a counter is incremented at step 920. Game controller 60 then determines whether the counter has reached a predefined threshold at step 922. Once the predefined threshold is reached, a second predefined number of stack symbols is added to the reel strip at step 924. Similar to step 914, 30 symbols are added to the reel strip in this embodiment, and the stack symbol to be added is selected from one of stack symbols 702-712. Again, in other embodiments, another predefined number of stack symbols may be added to the reel strip. The process then returns to step 916 to commence play of a subsequent round of the second feature game.

On the other hand, if at step 922 the counter has not yet reached the threshold, control returns to step 916 to commence a subsequent round of the second feature game.

In one embodiment, as will described in greater detail with reference to FIG. 10C below, the counter is at least partially indicated on top of the reels in the display. In that embodiment, a message 1002 indicates that the player needs to collect one more trigger symbol to trigger additional stack symbols.

Returning to step 918, the counter is not incremented if no trigger symbols are selected for display. In that case, after paying any awards after the round at step 926, if it is determined that the second feature game has not ended, control returns to step 916 to commence play of a subsequent round the second feature game. Otherwise, the second feature game ends and the player must return to step 802 to continue play of the gaming machine 10.

An embodiment of the third feature game is shown in FIG. 9C. After game selection and initiation at steps 814 and 816, the stacked standard symbols are transformed at step 930, not into stack symbols as per the first and second feature games, but into Wild symbols 714 as illustrated in FIG. 7. However, wild symbols triggered in the third feature game may differ from wild symbols triggered in the base game. In this embodiment, Wild symbol 714 triggered in the third feature game substitute for not only standard symbols and stack symbols 702-712 as in the base game, but also for trigger symbol 716. That is, Wild symbol 714 substitutes for all symbols in the third feature game, but only a subset of symbols in the base game. In other embodiments, wild symbols in the feature game differ in other ways. For example, the triggered wild symbol may substitute for a different subset of symbols, for symbols displayed in a specific combination of for symbols displayed in a specific symbol display position, etc.

Play of a first round of the third feature game then commences at step 932, and in this embodiment, play of the this third feature game is similar to play of the base game. That is, symbols are selected for display in the symbol display positions from the set of symbols defined by symbol data 632, the symbols data being modified to include at least one stack of Wild symbols 714. Any awards payable at the completion of the play at step 932 are determined and paid in step 934.

In some embodiments, the third feature game operates in a similar manner to the second feature game described above in that a counter is maintained and additional Wild symbols 714 are added to the reel strip when the counter reaches a predefined threshold.

At step 936, if it is determined that the second feature game has not ended, control returns to step 932 to commence play of a subsequent round the third feature game. Otherwise, the third feature game ends and the player must return to step 802 to continue play of the gaming machine 10.

EXAMPLES

More specific examples of embodiments of the invention are now described with reference to FIGS. 10A, 10B, 10C and FIG. 11. In general, as shown in these Figures, the game has a traditional 3×5 grid layout.

Figure 10A:
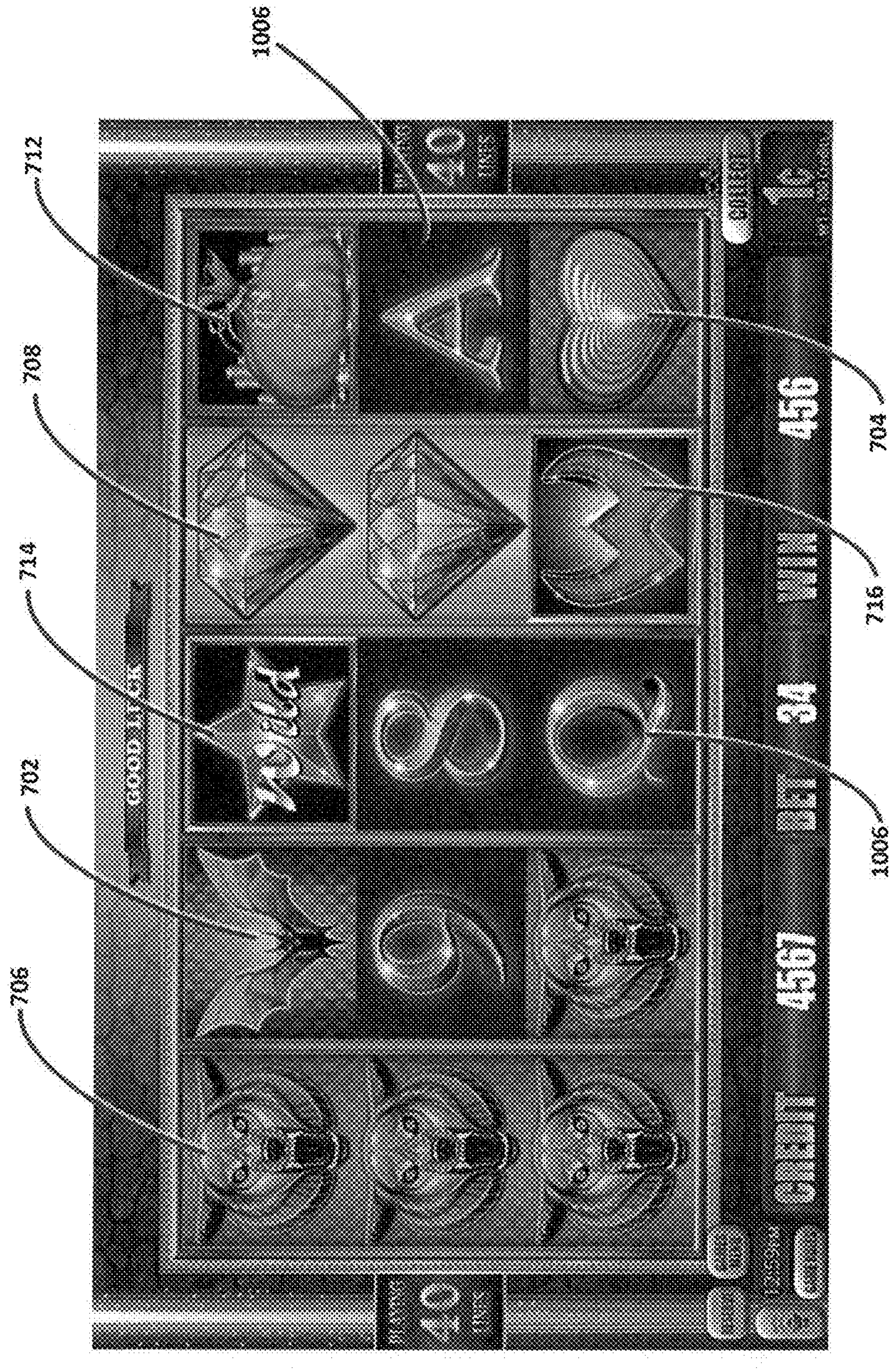
FIG. 10A is a screen representation of the base game of FIG. 8.

FIG. 10A is a screenshot of a base game provided by the gaming machine 10. Play of the base game is conducted in a standard manner as is known in the art, by selecting a plurality of symbols from a set of symbols to be displayed in respective ones of a plurality of symbol display positions. The difference in this example is that the set of symbols comprise standard symbols 1006, stacked symbols 702, 704, 706, 708, 712, Wild symbol 714 and trigger symbol 716. As noted above, in this base game, Wild symbol 714 substitutes for all symbols except trigger symbol 716. In this embodiment, all winning combinations defined in the payable 643 are evaluated from left to right, except trigger symbol 716 which are evaluated as scatters.

During play of the base game, the feature is triggered by 3, 4 or 5 scattered trigger symbols 716 being selected for display. As mentioned, in some embodiments, the feature may also be triggered at random.

In this example, when the feature is triggered there are 3 feature choice screens depending on the trigger. The player chooses their feature by touching a button indicating one of the 3 feature games. The feature games in this example are named WEIRD, WICKED & WILD, which respectively correspond to the first, second and third feature games described above. Free games are activated once the selection is made.

Figure 10B:
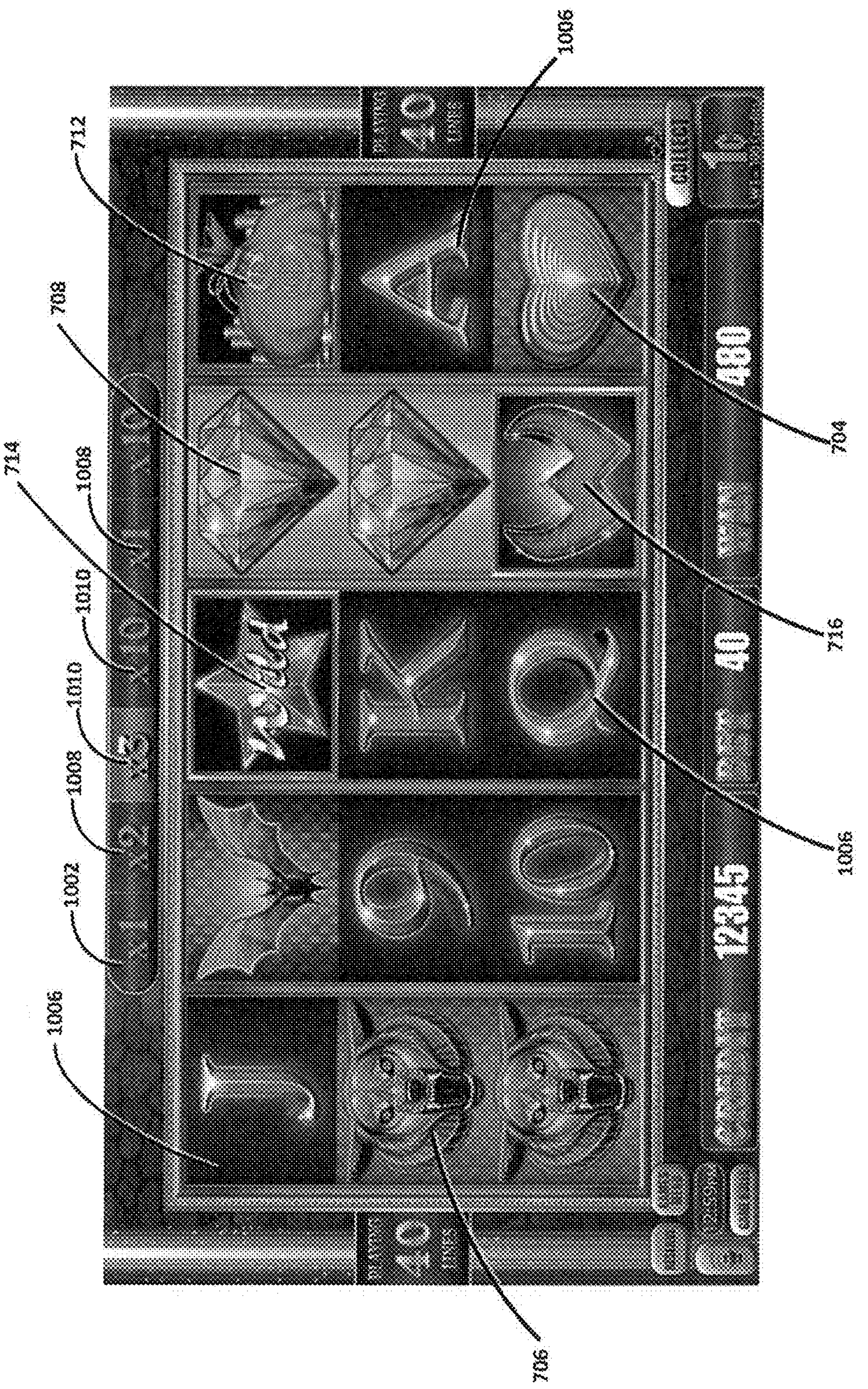
FIG. 10B is a screen representation of the first feature game of FIG. 7A.

FIG. 10B is a screenshot of the WEIRD feature game, which implements a multiplier free games feature in which 13, 20 or 26 free games are awarded with any 3, 4 or 5 trigger symbols 716, respectively. During the WEIRD feature, the message 1002 shows a plurality of award modifiers, in the form of multipliers 1008, displayed in respective ones of a plurality of modifier positions 1010. As shown in the FIG. 10B embodiment, the modifier positions 1010 are arranged in the form of a table and the multiplier values on the table are ×1, ×2, ×3, ×10, ×1 and ×10.

In this embodiment, any losing game advances emphasis of multipliers 1008 one position to the right on the table. FIG. 10B shows that the currently emphasised multiplier is ×3. Thus in response to a losing game, the emphasis will shift one position to the right to the ×10 multiplier. Note that in this embodiment, the maximum multiplier is ×10. If the player obtains another losing outcome, the emphasis will shift to the ×1 multiplier, effectively resetting the table.

As will be understood by those skilled in the art, a losing game in a typical reel game is one where no predefined symbol combinations can be formed from the symbols selected for display in the symbol display positions. Of course, in other embodiments, a losing outcome can be defined in any other way. For example, the symbol set can provide a specific losing symbol and whenever the losing symbol is selected for display, this results in a losing game.

Conversely, for a winning game such as when a winning symbol combination is formed, the award associated with that winning combination as defined in the pay table 643 is multiplied by the currently highlighted multiplier 1008, in this case ×3. Thus if the award for a winning combination is 10 credits, this award is multiplied by the ×3 multiplier so that the player will be awarded a total of 30 credits. Note that in some embodiments allow multiple winning combinations to be formed simultaneously. In that case, individual awards associated with each of the winning combinations are tallied and the total is multiplied by the currently emphasised multiplier. Furthermore, in some embodiments, the table may be reset after any win, or it may be reset at the end of the table.

In some embodiments, one or more of the stack symbols 702 to 712 may be assigned additional functionality. As described in more detail below with respect to FIG. 11, Money Bag symbol 712 may also trigger money bag prizes 1102, 1104 and 1106.

Like the base game, one embodiment provides that 3, 4 or 5 scattered trigger symbols 716 selected for display during the free games awards 5 extra free games. These extra free games are added to the remaining number of free games yet to be played, and do not trigger another opportunity to select one of the plurality of free games. This embodiment also prevents the mystery trigger from operating during the free games. However, other embodiments may provide a new opportunity to select from the plurality of feature games, and/or operation of the mystery trigger.

Figure 10C:
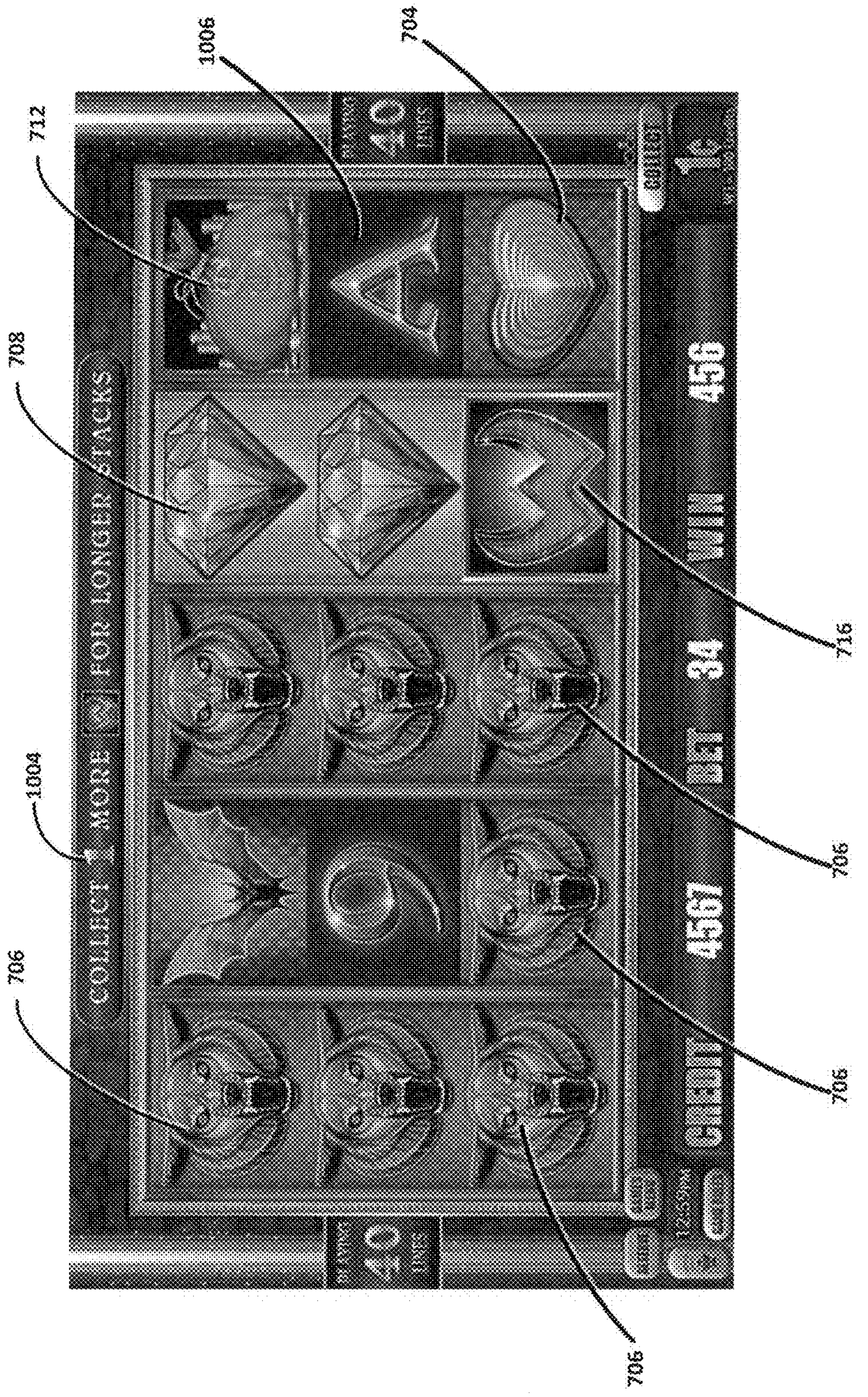
FIG. 10C is a screen representation of the second feature game of FIG. 7B.

FIG. 10C is a screenshot of the WICKED feature game, which awards 15, 18 or 25 free games with any 3, 4 or 5 scattered respectively.

Before play of the first free game starts, stacks increase by 10 on all reels. As described in an embodiment above, one of the standard symbols 1006 is chosen by the game controller 60, stacked on the reel strips and then transformed into one of the stack symbols 702-712. In this, the standard symbols are transformed into the Wolf stack symbol 706, as best shown on reels 1 and 3 of FIG. 10C. In this WICKED feature game, the Wolf symbol stack is increased by 10 additional Wolf symbols before play of the first free game.

The WICKED feature game also implements a counter, which is partially shown in the message 1004 located on the screen above the reels. In this embodiment, the actual counter is not shown. Instead, message 1004 shows how many additional stack symbols are required to reach a predefined threshold. In this case, message 1004 indicates the player only needs 1 more stack symbol to reach the predefined threshold. Once the threshold is reached, stacks on the reel strips then increase by 10 on all reels. In one embodiment, the predefined thresholds are set at 1, 3, 5 and 7 trigger symbols 716 collectively occurring over the free games. That is, collectively in the series of free games:

A first 10 stack symbols are added before the first free game;

A second 10 stack symbols are added if the counter reaches 1;

A third 10 stack symbols are added if the counter reaches 3;

A fourth 10 stack symbols are added if the counter reaches 5; and

A fifth 10 stack symbols are added if the counter reaches 7.

Thus, if 7 or more trigger symbols appear over the course of the awarded 15, 18 or 25 free games, the stacks on each reel would increase by 50 additional stack symbols.

In the WILD feature game (not shown) 10, 15 or 21 free games are awarded with any 3, 4 or 5 scattered trigger symbols 716, respectively, appearing during a base game. Similar to the WICKED feature game, one of the standard symbols 1006 are chosen to be stacked, and transformed into one of the stack symbols 702-712. However, instead of adding 10 symbols to the stack on the reel strips, one embodiment of the WILD feature game adds 30 additional stack symbols to the reel strips before the WILD feature game is initiated. The stacked symbols are then transformed into Wild symbols 714.

In one embodiment, not all stack symbols 702-712 are transformed into Wild symbols 714, but only a subset of predefined stack symbols are transformed. For example, anytime either a Diamond symbol 708, Heart symbol 704, Wolf symbol 706, Eyes symbol 710 or Bat symbol 702 is selected to be the stacked symbol the stacks on reels 2, 3, 4 and 5 is the transformation to Wild symbol 714 performed. Once transformed into Wild symbols, the WILD feature game then plays in a similar manner to the base game.

During play of the WILD feature games, Wild symbol 714 is assigned an additional functionality as compared with wild symbols appearing the base game. In this embodiment, that additional functionality is the ability to substitute for trigger symbol 716 in addition to standard symbols 1006 and stack symbols 702-712. In other embodiments, that additional functionality may be the ability to implement a symbol-driven jackpot, additional multipliers or any other additional functionality as is known by those skilled in the art.

Figure 11:
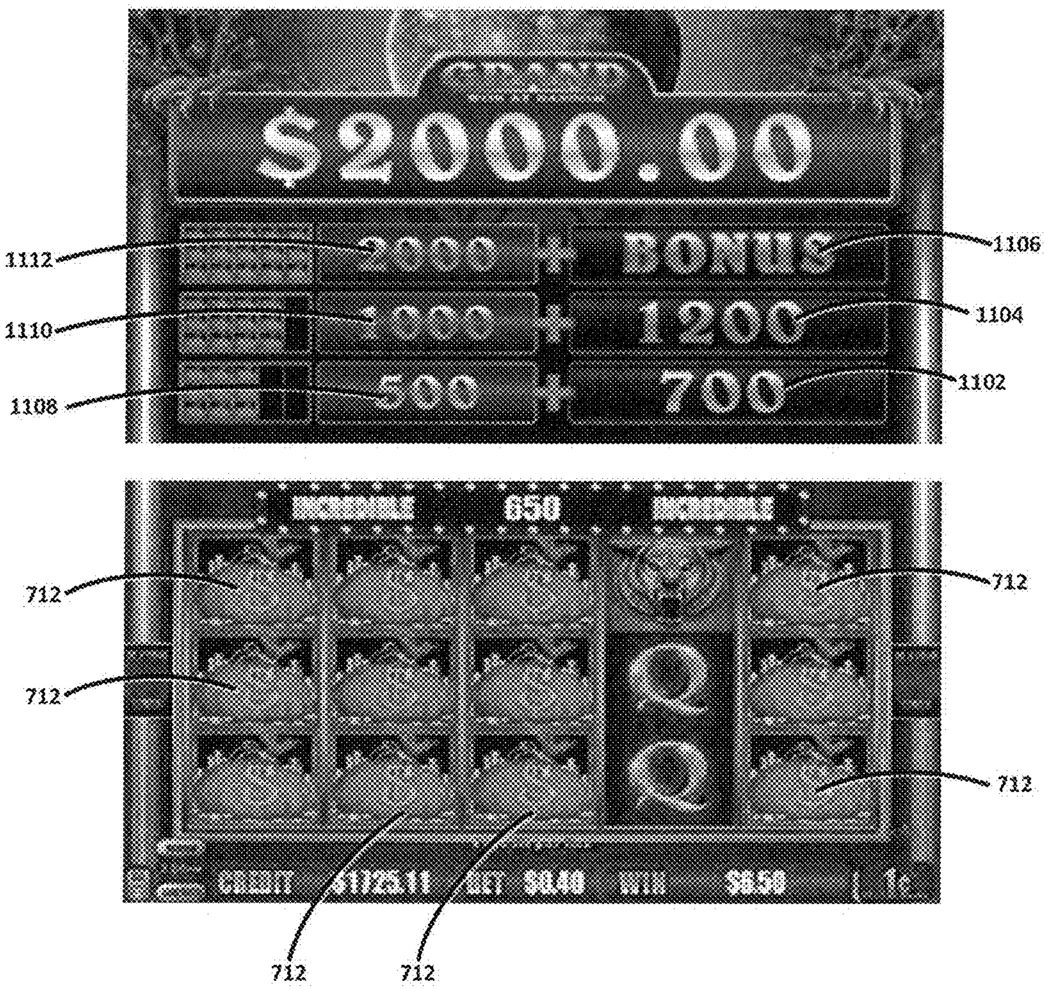
FIG. 11 is a screen representation of the Money Bags feature game of the gaming system of FIG. 1.

In some embodiments, as exemplified by the screen shot of FIG. 11, Money Bag symbol 712 is not implemented as a stack symbol, but a trigger symbol, which triggers a specific "Money Bag" feature.

In the Money Bag feature, the amount of a bonus prize is displayed as an incrementing amount on the display, and different incrementing bonus amounts are respectively associated with each additional stack of Money Bags symbol 712. Thus a first bonus amount is associated for 3 stacks 1102, a second bonus amount 1104 is associated for 4 stacks and a third bonus amount 1106 is associated for 5 stacks.

In one example, the bonus amounts start incrementing when the 3, 4 or 5 stack criteria is only partially fulfilled. For example, when 2 stacks of Money Bag symbol appears, the first bonus prize amount (which corresponds to the prize for 3 stacks of money bags) starts to increment while the other reels are spinning. While the first bonus prize is incrementing, the third reel may be highlighted or otherwise emphasised in some embodiments. This indicates to the player that there is potential to win the first bonus prize, if the third reel also reveals a money bag stack. Similarly, reels 4 and 5 may also be highlighted as they spin when 3 or 4 stacks of money bags appear respectively and the second or third bonus amount is being incremented.

In the embodiment of FIG. 11, each of the first, second and third bonus prizes are made up of a fixed amount, 1108, 1110 and 1112 respectively; and a variable amount 1102, 1104 and 1106 respectively. If the relevant bonus prize amount is not in play, the variable amount is replaced by the word BONUS. Once that bonus prize amount comes into play, the word BONUS disappears and is replaced with the incrementing amount. This is best shown by FIG. 11, in which the bonus prize amount 1106 is not in play because only 4 money bag stacks are revealed. The player in this instance wins the bonus prize for 4 stacks of money bags of 2200 credits, comprising the fixed amount 1110 (1000 credits) plus the variable amount 1104 (1200 credits). In some embodiments, the player also wins the bonus prize for 3 stacks of 1200 credits, comprising the fixed amount 1108

(500 credits) plus the variable amount 1102 (700 credits). In that embodiment, the total bonus prize is therefore 3400 credits.

Further aspects of the method will be apparent from the above description of the system. It will be appreciated that at least part of the method will be implemented electronically, for example, digitally by a processor executing program code such as in the above description of a game controller. In this respect, in the above description certain steps are described as being carried out by a processor of a gaming system, it will be appreciated that such steps will often require a number of sub-steps to be carried out for the steps to be implemented electronically, for example due to hardware or programming limitations. For example, to carry out a step such as evaluating, determining or selecting, a processor may need to compute several values and compare those values.

As indicated above, the method may be embodied in program code. The program code could be supplied in a number of ways, for example on a tangible computer readable storage medium, such as a disc or a memory device, e.g. an EEPROM, (for example, that could replace part of memory 103) or as a data signal (for example, by transmitting it from a server). Further different parts of the program code can be executed by different devices, for example in a client server relationship. Persons skilled in the art, will appreciate that program code provides a series of instructions executable by the processor.

It is to be understood that, if any prior art is referred to herein, such reference does not constitute an admission that the prior art forms a part of the common general knowledge in the art in any country.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

The invention claimed is:

1. A gaming machine configured to play a base game and a plurality of feature games, the gaming machine comprising:

a credit input mechanism configured to receive a physical item representing a monetary value for establishing a credit balance, the credit balance being increasable and decreasable based at least on wagering activity;

credit meters configured to monitor the credit balance;

a display;

a reel strip comprising a plurality of trigger symbols, stack symbols, wild symbols and standard symbols;

a symbol selector configured to, in accord with the wagering activity, select a plurality of symbols from the reel strip to be displayed on the display during play of a base game, wherein in the base game, said wild symbols substitute for only stack symbols and standard symbols;

an outcome evaluator configured to monitor play of the game, wherein when a predefined number of trigger symbols is selected for display, a plurality of feature games are triggered; and an interface configured to receive a selection of one of the plurality of triggered feature games to play, wherein, in response to said selection and before initiating play of the selected feature game, the symbol selector is further configured to select:

a) a first of the plurality of standard symbols in the reel strip to be stacked such that a plurality of the selected first standard symbols are arranged adjacent each other on the reel strip; and b) a first of the plurality of stack symbols in the reel strip, the plurality of selected first standard symbols being transformed into the selected first of the plurality of stack symbols; and a payout mechanism configured to provide a payout.

2. A gaming machine according to claim 1 wherein the return to player (RTP) of the gaming machine changes based on which of the plurality of feature games is selected for play.

3. A gaming machine according to claim 1 wherein the RTP of the gamine machine remains constant regardless of which of the plurality of feature games is selected for play.

4. A gaming machine according to claim 1 wherein a first of the plurality of feature games comprises a plurality of award modifiers that are arranged on the display in respective ones of a plurality of modifier positions located adjacent each other.

5. A gaming machine according to claim 4 wherein one of said plurality of modifier positions is selectively emphasised on the display, thereby to indicate that the award modifier corresponding to the emphasised modifier position has been activated.

6. A gaming machine according to claim 5 wherein for each round of play of the first feature game that is determined to be a losing round, another of said plurality of modifier positions is selectively emphasised.

7. A gaming machine according to claim 4 wherein an award is associated with each combination of symbols that is a predefined winning symbol combination, and wherein before any award is paid, the award is modified by the award modifier that is emphasised when the award is won.

8. A gaming machine according to claim 4 wherein at least one of the plurality of award modifiers comprises an award multiplier.

9. A gaming machine according to claim 1 wherein a second of the plurality of feature games comprises adding a first predefined number of stack symbols to said reel strip prior to initiating play of the second feature game.

10. A gaming machine according to claim 9 wherein the second feature game further comprises a counter, and wherein for each round of play of the second feature game, said counter is incremented by a predefined number for each time a trigger symbol is selected for display.

11. A gaming machine according to claim 10 wherein when said counter reaches a predefined threshold, a second predefined number of stack symbols is added to the reel strip.

12. A gaming machine according to claim 1 wherein a third of the plurality of feature games comprises adding a predefined number of stack symbols to said reel strip and transforming said plurality of stack symbols into wild symbols prior to initiating play of the third feature game.

13. A gaming machine according to claim 12 wherein for each round of play of the third feature game, the wild symbol substitutes for the trigger symbols in addition to the standard symbols and stack symbols.

14. An electronic method of gaming on a gaming machine having a credit input mechanism configured to receive a physical item representing a monetary value for establishing a credit balance, the credit balance being increasable and decreasable based at least on wagering activity, credit meters configured to monitor the credit balance, a reel strip, a display, a payout mechanism, an interface, and a game controller having a symbol selector and an outcome evaluator, the method comprising:

establishing the credit balance via the credit input mechanism;

selecting, in accord with the wagering activity, using the symbol selector a plurality of symbols from the reel strip to be displayed on a display during play of a base game, the reel strip comprising a plurality of trigger symbols, stack symbols, wild symbols and standard symbols, wherein in the base game, said wild symbols substitute for only stack symbols and standard symbols;

monitoring the symbols selected for display using the outcome evaluator, wherein when a predefined number of trigger symbols is selected for display, a plurality of feature games are triggered; and receiving a selection via the interface one of the plurality of triggered feature games to play;

in response to said selecting and before initiating play of the selected feature game, selecting via the symbol selector:

a) a first of the plurality of standard symbols in the reel strip to be stacked such that a plurality of the selected first symbols are arranged adjacent each other on the reel strip; and b) a first of the plurality of stack symbols in the reel strip, the plurality of selected first symbols being transformed into the selected first of the plurality of stack symbols;

initiating play of the selected feature game; and providing a payout via the payout mechanism.

15. A method of gaming according to claim 14 wherein the return to player (RTP) of the gaming machine changes based on which of the plurality of feature games is selected for play.

16. A method of gaming according to claim 14 wherein the RTP of the gamine machine remains constant regardless of which of the plurality of feature games is selected for play.

17. A method of gaming according to claim 14 wherein a first of the plurality of feature games comprises a plurality of award modifiers that are arranged on the display in respective ones of a plurality of modifier positions located adjacent each other.

18. A method of gaming according to claim 17 wherein one of said plurality of modifier positions is selectively emphasised on the display, thereby to indicate that the award modifier corresponding to the emphasised modifier position has been activated.

19. A method of gaming according to claim 18 wherein for each round of play of the first feature game that is determined to be a losing round, another of said plurality of modifier positions is selectively emphasised.

20. A method according to claim 19 wherein an award is associated with each combination of symbols that is a predefined winning symbol combination, and wherein before any award is paid, the award is modified by the award modifier that is emphasised when the award is won.

21. A method according to claim 19 wherein at least one of the plurality of award modifiers comprises an award multiplier.

22. A method of gaming according to claim 14 wherein a second of the plurality of feature games comprises adding a first predefined number of stack symbols to said reel strip prior to initiating play of the second feature game.

23. A method of gaming according to claim 22 wherein the second feature game further comprises a counter, and wherein for each round of play of the second feature game, said counter is incremented by a predefined number for each time a trigger symbol is selected for display.

24. A method of gaming according to claim 23 wherein when said counter reaches a predefined threshold, a second predefined number of stack symbols is added to the reel strip.

25. A method of gaming according to claim 14 wherein a third of the plurality of feature games comprises adding a predefined number of stack symbols to said reel strip and transforming said plurality of stack symbols into wild symbols prior to initiating play of the third feature game.

26. A method of gaming according to claim 25 wherein for each round of play of the third feature game, the wild symbol substitutes for the trigger symbols in addition to the standard symbols and stack symbols.

27. A method of gaming according to claim 14, further comprising executing computer program code.

28. A method of gaming according to claim 14, further comprising storing the computer program code in a tangible computer readable medium.

* * * * *